Dec. 11, 1951  D. THRONE  2,578,157
FLASH SYNCHRONIZER MOUNTING FOR CAMERAS
Filed July 11, 1947
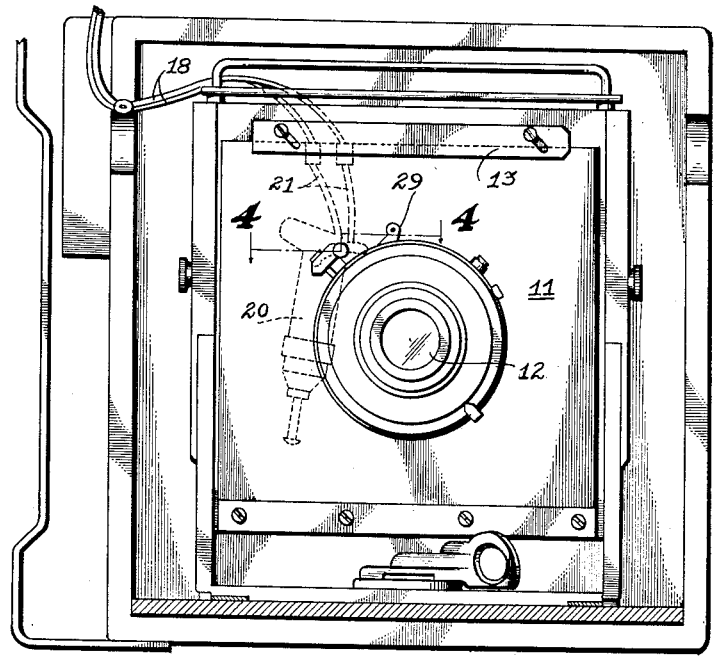
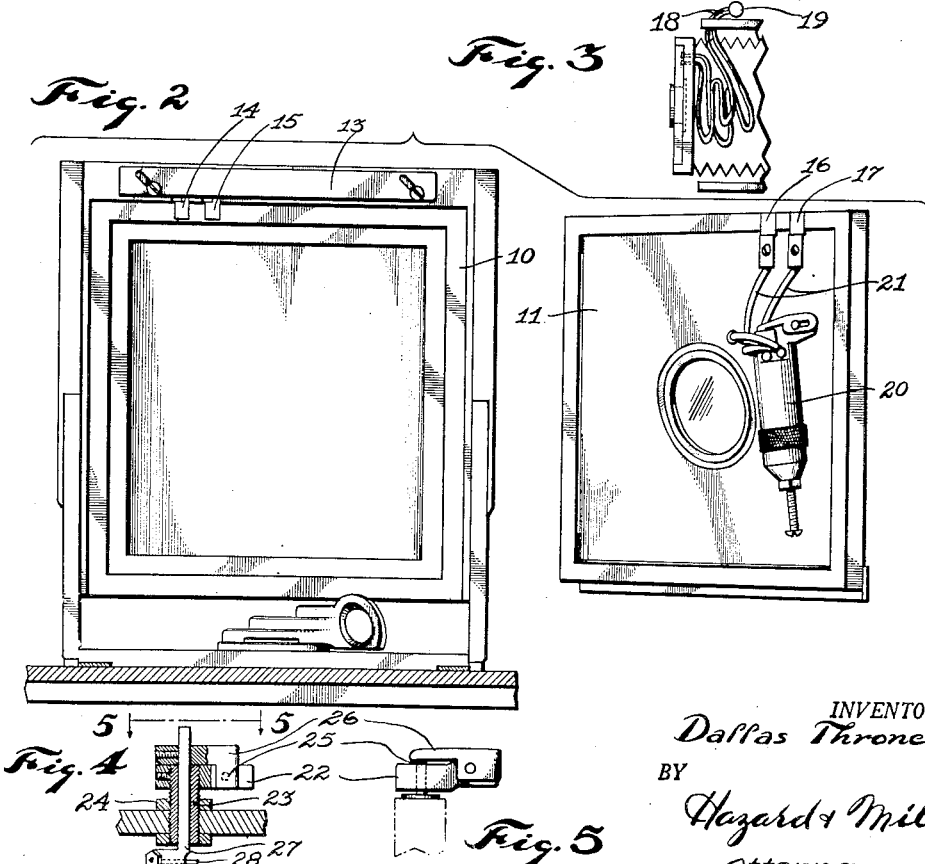
INVENTOR.
Dallas Throne
BY
Hazard & Miller
Attorneys Patented Dec. 11, 1951

2,578,157

UNITED STATES PATENT OFFICE 2,578,157

FLASH SYNCHRONIZER MOUNTING FOR CAMERAS

Dallas Throne, La Verne, Calif., assignor of one-half to James C. Reher, Jr., Covina, Calif.

Application July 11, 1947, Serial No. 760,391

3 Claims. (Cl. 95—11.5)

This invention relates to a synchronizer mounting for cameras.

In a popular and conventional type of camera now in general use there is a lens board frame within which there is removably mounted a lens board carrying a lens, an adjustable iris, a shutter and a shutter control mechanism. When a flashlight gun is mounted on the camera for flashlight purposes, a synchronizer has heretofore been mounted on the forward face of the lens board. This synchronizer is operatively connected to the shutter control and electrically connected by wires to the gun. The purpose of the synchronizer is to assure the operation of the shutter for the lens in proper timed relationship to the setting off of the flashlight bulb. Cameras of this type are usually supplied with a plurality of interchangeable or substitutable lens boards having different lenses designed to meet various photographic requirements. When it is desired to substitute a lens board in the lens board frame and thereby effect a substitution of lenses, it has been common to detach the synchronizer from the lens board that is to be removed and disconnect it from its shutter control mechanism. The lens board can then be removed and a substitution made, after which the synchronizer is applied to the forward face of the new lens board and connected to its shutter control mechanism. The detachment of the synchronizer from the lens board is apt to be a time-consuming operation that may be objectionable. Furthermore, when the synchronizer is connected to the shutter control mechanism of the substituted lens board it frequently must be re-adjusted for proper operation therewith. Another objection to the mounting of the synchronizer on the forward face of the lens board is that it may interfere with making various adjustments of the lens or, if it is struck or disturbed in the course of making these adjustments, the synchronizer itself may be thrown out of adjustment.

An object of the present invention is to provide an improved synchronizer mounting wherein each of the substitutable lens boards has the synchronizer more or less permanently mounted thereon so as to be substitutable therewith and wherein the lens board frame has a pair of contacts electrically connected to the flashlight gun that are engageable by contacts on all of the substitutable lens boards to which their respective synchronizers are electrically connected. In this manner a substitution of a lens board to secure a substitution of lenses does not involve the removal or disturbance of the synchronizer and instead the synchronizers on each of the lens boards will be substituted therewith. The synchronizers will be automatically connected to the gun through the contacts on the lens board and lens board frame and will not be thrown out of adjustment with relation to their respective shutter control mechanisms in the course of effecting the substitution.

Another object of the invention is to provide a synchronizer mounting for lens boards wherein the synchronizer instead of being mounted on the forward face of the lens board, is mounted on the rear face thereof and connected to the shutter control mechanism through the lens board. In this manner the synchronizer does not interfere with the making of various lens adjustments and is effectively protected from being disturbed in the course of making adjustments and thus thrown out of fine adjustment with relation to the shutter control mechanism.

With the foregoing and other objects in view, which will be made manifest in the following detailed description and specifically pointed out in the appended claims, reference is had to the accompanying drawings for an illustrative embodiment of the invention, wherein:

Figure 1 is a view in front elevation of a camera having a removable and replaceable lens board and illustrating the synchronizer as having been mounted thereon in accordance with the present invention;

Fig. 2 is a view similar to Fig. 1 but illustrating the lens board as having been removed and turned to illustrate its rear side;

Fig 3 is a partial plan view of the lens board frame and associated structure;

Fig. 4 is a partial view in horizontal section taken approximately upon the line 4—4 upon Fig. 1; and Fig. 5 is a partial view in side elevation and may be regarded as taken substantially upon the line 5—5 upon Fig. 4.

Referring to the accompanying drawing wherein similar reference characters designate similar parts throughout, the camera illustrated has a lens board frame generally indicated at 10 within which is removably receivable a lens board 11 having a lens 12. The lens board 11 is retained within the frame by means of a lock 13 and on shifting this lock from the position shown in Fig. 1 to the position shown in Fig. 2 a lens board within the frame, together with its iris and shutter control mechanism, are removed therewith. On the substitution of a new lens board a different lens 12 together with its associated structure is substituted in the camera.

In accordance with the present invention a pair of contacts 14 and 15 are mounted on the lens board frame 10 so as to be engaged by contacts 16 and 17 that are mounted on the rear face of each of the substitutable or replaceable lens boards. Thus all of the replaceable lens boards 11 for a given camera will be equipped with contacts 16 and 17 so positioned that they will automatically engage the contacts 14 and 15 when any lens board is positioned in the lens board frame 10. To this extent the contacts 14 and 15 may be regarded as common to the contacts 16 and 17 on all of the lens boards. Wires 18 connect the contacts 14 and 15 on the lens board frame to the gun illustrated at 19. The synchronizer generally indicated at 20 is mounted on the rear or inner side of the lens board 10 and is electrically connected by the wires 21 to the contacts 16 and 17. Any conventional or preferred form of synchronizer may be employed. That type of synchronizer illustrated, however, is mounted on the rear face of the lens board 11 by means of a bracket 22 which, in turn, is mounted on an externally threaded sleeve or bushing 23 that extends through lens board 11 and which is locked in place by means of a nut 24. The synchronizer illustrated, when actuated, causes a pin 25 to move upwardly into engagement with a crank 26 that is mounted on a rocker shaft 27 that extends through the sleeve or bushing 23.

I prefer to connect the forward end of the rocker shaft to the cable release mechanism indicated at 28 that releases or actuates the shutter although, if desired, the rocker shaft 27 may be connected to the shutter trigger 29. By connecting the rocker shaft to the cable release mechanism or the shutter, any lost motion in the links or levers between the shutter and the trigger 29 is avoided.

It will be appreciated that with the synchronizer located on the rear face of the lens board 11 it in no way interferes with any adjustment of the lens or adjustment of the iris or shutter mechanism. When it is desired to effect a substitution of lenses the lock 13 is actuated to release the lens board and the lens board together with all associated structure, including the synchronizer 20, iris 21 and contacts 16 and 17, may be removed as a unit from the lens board frame 10. The substituting or replacing lens board may then be installed and when applied its contacts 16 and 17 will automatically engage the contacts 14 and 15, completing the electrical connection between the synchronizer and the gun. It will be observed that in the course of effecting a substitution in this manner it is unnecessary to disturb the synchronizer in the least and any fine adjustment of the synchronizer with respect to the shutter-operating mechanism on its lens board is retained. Consequently, once the synchronizer has been accurately adjusted for proper use with the shutter mechanism on its lens board, this is in no way disturbed in the course of application or removal of the lens board.

Various changes may be made in the details of construction without departing from the spirit and scope of the invention as defined by the appended claims.

I claim:

1. In combination with a camera having a lens board frame, a removable and replaceable lens board therein and a flashlight gun, a synchronizer mounted on the rear side of lens board operatively connected through the lens board to a shutter control mechanism thereon, and mutually engageable contacts on the lens board frame and lens board electrically connected to the gun and synchronizer respectively whereby on removing and replacing the lens board the synchronizer may be replaced therewith and upon installing the replacing lens board with its synchronizer in the lens board frame its synchronizer will be automatically connected to the gun upon engagement between the contacts on the replacing lens board and the contacts on the lens board frame.

2. A lens board for cameras having a synchronizer mounted on the inner face thereof, means operatively connecting the synchronizer through the lens board to the shutter control, and contacts on the rear face of the lens board electrically connected to the synchronizer, said contacts being arranged to engage a complementary set of contacts on the lens board frame of a camera on which the lens board may be mounted.

3. In combination with a camera having a lens board frame, a removable and replaceable lens board therein having a shutter, a gun, a synchronizer mounted on the rear side of the lens board, a bushing extending through the lens board, a rocker shaft rotatably supported by the bushing and extending through the bushing, the outer end of the rocker shaft being operatively connected to the shutter to actuate the same when said rocker shaft is rocked, means operatively connecting the inner end of the rocker shaft to the synchronizer to enable the synchronizer to rock the rocker shaft when the synchronizer is energized, and mutually engageable contacts on the lens board frame and the lens board electrically connected to the gun and synchronizer respectively whereby on removing and replacing the lens board the synchronizer may be replaced therewith and upon installing the replacing lens board with its synchronizer in the lens board frame its synchronizer will be automatically connected to the gun upon engagement between the contacts on the replacing lens board and the contacts on the lens board frame.

DALLAS THRONE.

REFERENCES CITED

The following references are of record in the file of this patent:

UNITED STATES PATENTS

| Number | Name | Date |
|---|---|---|
| 1,354,999 | Picri | Oct. 5, 1920 |
| 1,963,095 | Petit et al. | June 19, 1934 |
| 2,145,917 | Boesser | Feb. 7, 1939 |
| 2,161,355 | Jacobson | June 6, 1939 |
| 2,317,465 | Kende et al. | Apr. 27, 1943 |
| 2,464,671 | Castedello | Mar. 15, 1949 |